(12) United States Patent
Freeman et al.

(10) Patent No.: US 8,964,730 B2
(45) Date of Patent: Feb. 24, 2015

(54) IP TELEPHONE PROVISIONING SYSTEM AND METHODS

(75) Inventors: Michael B. Freeman, Colorado Springs, CO (US); Stuart M. Hiser, Colorado Springs, CO (US); Mark Leak, Colorado Springs, CO (US); William Vanderoef, Monument, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 237 days.

(21) Appl. No.: 13/307,180

(22) Filed: Nov. 30, 2011

(65) Prior Publication Data

US 2012/0076135 A1   Mar. 29, 2012

Related U.S. Application Data

(63) Continuation of application No. 11/533,539, filed on Sep. 20, 2006, now Pat. No. 8,098,652.

(51) Int. Cl.
| | |
|---|---|
| H04L 12/66 | (2006.01) |
| H04L 29/12 | (2006.01) |
| H04L 12/24 | (2006.01) |
| H04M 3/42 | (2006.01) |
| H04M 7/00 | (2006.01) |
| H04L 29/08 | (2006.01) |
| H04M 1/253 | (2006.01) |

(52) U.S. Cl.
CPC ...... *H04L 29/12216* (2013.01); *H04L 41/0806* (2013.01); *H04L 41/0843* (2013.01); *H04L 61/2007* (2013.01); *H04M 3/42178* (2013.01); *H04M 7/0087* (2013.01); *H04L 67/125* (2013.01); *H04L 41/0893* (2013.01); *H04M 1/2535* (2013.01)
USPC ........................................................ 370/352

(58) Field of Classification Search
USPC .................. 370/271, 352, 338, 254; 455/418, 455/552.1; 379/93.01; 340/10.42; 709/228; 713/173
See application file for complete search history.

(56) References Cited

U.S. PATENT DOCUMENTS

| | | | |
|---|---|---|---|
| 7,471,673 B2 | 12/2008 | Arai | |
| 8,483,374 B1* | 7/2013 | Tonogai et al. | 379/201.12 |
| 2002/0105946 A1 | 8/2002 | Takeuchi | |
| 2004/0125923 A1 | 7/2004 | See et al. | |
| 2005/0180403 A1 | 8/2005 | Haddad et al. | |
| 2005/0198218 A1 | 9/2005 | Tasker et al. | |
| 2006/0256778 A1* | 11/2006 | Nakamura | 370/352 |
| 2008/0046735 A1* | 2/2008 | Nedeltchev et al. | 713/173 |
| 2008/0049623 A1* | 2/2008 | Qiu et al. | 370/241 |
| 2008/0065902 A1 | 3/2008 | Spohrer et al. | |
| 2008/0069318 A1 | 3/2008 | McClung | |
| 2008/0075245 A1* | 3/2008 | Pearson et al. | 379/88.13 |
| 2008/0240398 A1 | 10/2008 | Baumeister et al. | |

* cited by examiner

*Primary Examiner* — Andrew Lai
*Assistant Examiner* — Jamaal Henson

(57) ABSTRACT

A method and apparatus relate to receiving and storing data through an interface for an Internet Protocol (IP) telephone database. The interface receives a request related to provisioning a function of an IP telephone. In response to receiving the request, data from the IP telephone database may be transmitted to the IP telephone to be used to provision the function.

20 Claims, 9 Drawing Sheets

500

Main Page
510
To View and Edit phone configuration files Click Here.

To Search for a single phone configuration file Click Here.

To Create a new phone configuration file Click Here.

To Reload a single phone Click Here.

To View and Edit a phone default configuration file Click Here.

To View and Edit phone Templates Click Here.

To Create a phone Template Click Here.

To Add a new phone using a Template Click Here.

To Create phone configurations via a MAC file Click Here.

To View and Edit a Dial Plan Click Here.

Add New Phone    Template=Freeman & Associates  610

| | |
|---|---|
| Phone ID | [please enter] 630 |
| MAC Address  620 | [please enter] 630 |
| Phone Label | |
| Dial Plan | |
| Time Zone | |
| Network Media Type | |
| Proxy Emergency Address | |
| Proxy Emergency Port | |
| Proxy Backup Address | |
| Proxy Backup Port | |
| Messages URI | |
| Enable VAD | |
| User Info | [please enter] 630 |
| Line 1 | |
| Line Number | |
| Line Display Name | |
| Authorization Name | |
| Password | [please enter] 630 |
| Line 2 | |
| Line Number | |
| Line Display Name | |
| Authorization Name | |
| Password | [please enter] 630 |

Phone Edit Tool 710

| | |
|---|---|
| IP Address 720 | [166.34.133.205] 730 |
| Last Downloaded | [2006-04-26 02:13:52] |
| Last Updated | [2006-05-23 20:27:31] |
| MAC Address | [000750D54315] |
| | |
| Phone Label | [Stu Hiser] |
| Location | [Denver] |
| Phone Type | [default] |
| Template | [Freeman & Associates] |

Line 1

| | |
|---|---|
| Line Number | [123-456-7890] |
| Line Display Name | [default] |
| Authorization Name | [default] |
| Password | [please enter] |

Phone Attributes

| | |
|---|---|
| Dial Plan | [default] |
| Time Zone | [EDT] |
| Network Media Type | [default] |
| Proxy Emergency Address & Port | [please enter] |

Phone Template Edit 810 830

| | |
|---|---|
| Template Name 820 | [Freeman & Associates] |
| Description | [all phones] |
| Default Location | [Denver] |
| Phone Type | [default] |

Phone Template Configuration

| | |
|---|---|
| Proxy Server Address | [234.137.731.990] |
| Proxy Server IP Address / Port | [53.765.942.744] |

Dynamic DNS/TFTP Support

| | |
|---|---|
| Dynamic DNS Address | [166.33.193.132] |
| Dynamic DNS Address | [166.33.187.21] |

Phone Proxy Information

| | |
|---|---|
| Line 1 Proxy Address / Port | [verizon.globalip.com] |
| Password | [please enter] |
| Logo URL | [please enter] |
| Network Media Type | [default] |
| Codec for Media Stream | [default] |
| Dial Plan | [default] |
| VOIP Control Port | [please enter] |

Dial Plan Edit  910  930        940    950      960      970

| Match | Timeout | User  | Route   | Rewrite | Comments |
|-------|---------|-------|---------|---------|----------|
| 0     | 1       | phone | Default |         | Operator |
| 011   | 3       | phone | Default |         | International |
| 911   | 0       | phone | Default |         | Emergency |
| 1     | 3       | phone | Default |         |          |
| 2     | 3       | phone | Default |         |          |
| 3     | 3       | phone | Default |         |          |
| 4     | 3       | phone | Default |         |          |
| 5     | 3       | phone | Default |         |          |
| 6     | 3       | phone | Default |         |          |
| 7     | 3       | phone | Default |         |          |
| 703   | 1       | phone | Default |         | Virginia |
| 719   | 1       | phone | Default |         | Denver   |
| 212   | 1       | phone | Default |         | New York |

(920 points to the "011" row)

FIG. 9

IP TELEPHONE PROVISIONING SYSTEM AND METHODS

RELATED APPLICATION

This application is a continuation of U.S. patent application Ser. No. 11/533,539, filed Sep. 20, 2006, the disclosure of which is incorporated by reference herein in its entirety.

TECHNICAL FIELD OF THE INVENTION

Systems and methods described herein generally relate to Internet Protocol (IP) telephone devices and, more particularly, to provisioning IP telephone devices.

DESCRIPTION OF RELATED ART

Communication devices, such as IP telephones, have become increasingly complex and versatile. For example, IP telephones often include numerous features that enable users to perform a variety of functions. In order to activate the phone and perform these functions, the data necessary to provision an IP telephone must be manually entered into the IP telephone. Further, when IP telephones do not function correctly, the process of error detection and correction may be laborious as the data entry records of each IP telephone may not be recorded.

BRIEF DESCRIPTION OF THE DRAWINGS

Reference is made to the attached drawings, wherein elements having the same reference number designation may represent like elements throughout.

FIG. 5 is an exemplary IP telephone database interface screen;

FIG. 6 is an exemplary IP telephone database template interface screen;

FIG. 7 is an exemplary IP telephone database phone edit interface screen;

FIG. 8 is an exemplary IP telephone database template edit interface screen; and FIG. 9 is an exemplary IP telephone database dial plan edit interface screen.

DETAILED DESCRIPTION

The following detailed description refers to the accompanying drawings. The same reference numbers in different drawings identify the same or similar elements. Also, the following detailed description does not limit the systems and methods described herein. Instead, the scope of the systems and methods are defined by the appended claims and equivalents.

Figure 1:
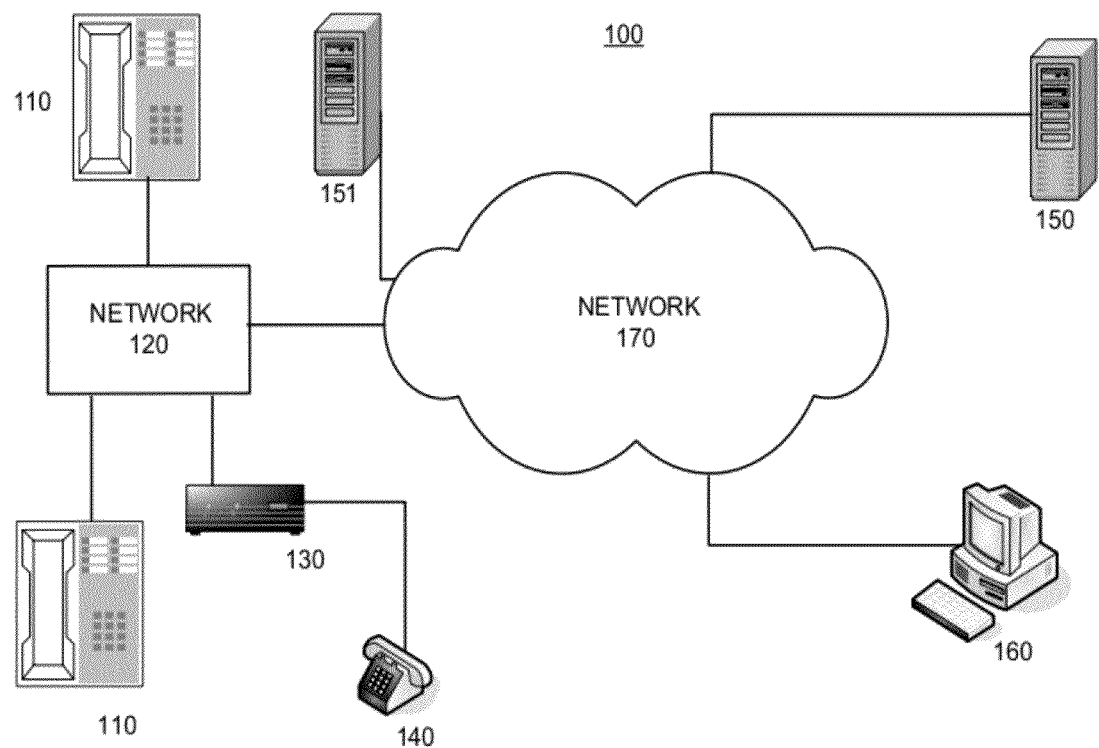
FIG. 1 is a diagram of an exemplary system in which methods and systems described herein may be implemented.

FIG. 1 is a diagram of an exemplary system 100 in which methods and systems described herein may be implemented. System 100 may include IP telephones 110, network 120, analog telephony adapter 130, telephone 140, servers 150 and 151, computer 160 and network 170. It should be understood that system 100 may include any number of additional devices and/or networks.

IP telephone 110 may include a telephone with a multi-line display that may also perform computer processes and functions such as data processing, data communications capabilities, Internet/Intranet accessing and Web browsing features, for example. IP telephone 110 may also communicate over LAN or WAN networks and may communicate via networks 120 and 170. IP telephone 110 may communicate using an Internet Protocol (IP) and/or Voice over Internet Protocol (VoIP), for example. Telephone 110 may also include a keypad for dialing phone numbers in order to communicate over a telephone network, such as network 120 and the (PSTN).

Network 120 may include one or more networks including an (IP) network, a telephone network, such as the Public Switched Telephone Network (PSTN), or a metropolitan area network (MAN). Network 120 may also include a modem or an Ethernet interface, for example. IP telephones 110 may communicate over network 120 using, for example Voice over Internet Protocols (VoIP). Network 120 may also include devices such as switches, routers, firewalls, gateways, and/or servers (not shown) in order to transmit/receive and route data to/from the connected network devices.

Network 120 may be a hardwired network using wired conductors and/or optical fibers and/or may be a wireless network using free-space optical and/or radio frequency (RF) transmission paths. Implementations of network 120 and/or devices operating on network 120 described herein are not limited to any particular data type, and/or protocol.

Analog telephony adapter 130 may include hardware and software necessary to convert between digital and analog signals. For example, analog telephony adapter 130 may receive digital signals from network 120 and convert these signals into analog signals to be transmitted to telephone 140, for example. Analog telephony adapter 130 may also receive analog signals from telephone 140 and convert these signals to digital signals, which may be transmitted to network 120.

Telephone 140 may include circuitry for communicating voice transmissions to and from other telephones and/or IP telephones 110. Telephone 140 may also include a keypad for dialing phone numbers in order to communicate over a telephone network, such as the (PSTN).

Server 150 may include one or more processors or microprocessors enabled by software programs to perform functions, such as data storage and transmission, coder decoder (codec) conversion, and interfacing with other servers and IP telephones 110, for example. Server 150 may also include a data storage memory such as a random access memory (RAM) or another dynamic storage device that stores information such as an IP telephone database, as described in detail below.

Server 150 may also include a communication interface that may include any transceiver-like mechanism that enables server 150 to communicate with other devices and/or systems. For example, server 150 may include a modem or an Ethernet interface to a network 170. In addition, server 150 may include other mechanisms for communicating data via a network, such as a wireless network, for example. Server 151 may include similar elements as server 150.

Computer 160 may include one or more processors or microprocessors enabled by software programs to perform functions, such as data storage and transmission, codec conversion, and interfacing with networks, servers and IP telephones, for example. Computer 160 may include software to enable web-based communications over network 170, network 120 and/or the Internet. Computer 160 may also include a data storage memory, such as a random access memory (RAM) or another dynamic storage device that stores information. Computer 160 may also include a keyboard for entering data, a mouse for selecting data or pointing to data, and a CRT or flat panel display monitor.

Network 170 may include one or more networks including an (IP) network, a telephone network, such as the (PSTN), a (MAN), or another network. Servers, computers and IP telephones may communicate with each other over network 170 and may communicate with other IP telephones via other networks connected to network 170, for example. Network 170 may also include devices such as switches, routers, firewalls, gateways, and/or servers (not shown) in order to transmit/receive and route data to/from other connected network devices.

Network 170 may be a hardwired network using wired conductors and/or optical fibers and/or may be a wireless network using free-space optical and/or radio frequency (RF) transmission paths. Implementations of network 170 and/or devices operating on network 170 described herein are not limited to any particular data type, and/or protocol.

Figure 2:
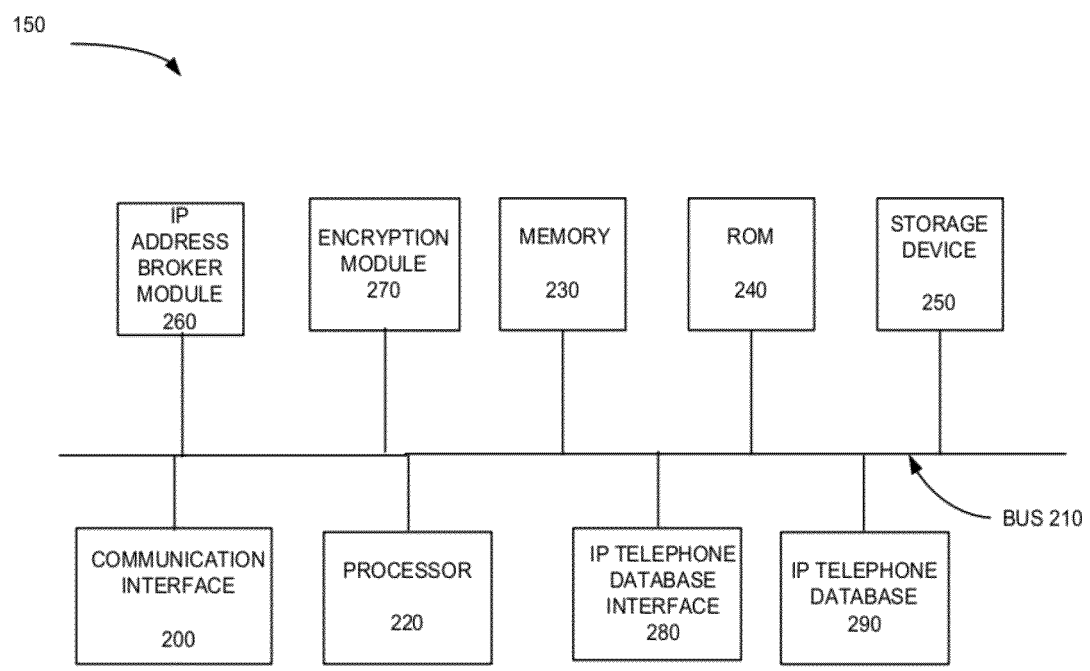
FIG. 2 is a diagram of an exemplary server shown in FIG. 1.

FIG. 2 is a diagram of an exemplary configuration of server 150. Server 150 may include communication interface 200, bus 210, processor 220, memory 230, read only memory (ROM) 240, storage device 250, IP address broker module 260, encryption module 270, IP telephone database interface 280, and IP telephone database 290. Bus 210 permits communication among the components of server 150. Server 150 may also include one or more power supplies (not shown). One skilled in the art would recognize that server 150 may be configured in a number of other ways and may include other or different elements.

Communication interface 200 may include communication mechanisms that enable server 150 to communicate with other devices and/or systems. For example, communication interface 200 may include a modem or an Ethernet interface to a WAN or LAN. In addition, communication interface 200 may include other mechanisms for communicating via a network, such as a wireless network. Communication interface 200 may also include transmitters/receivers for communicating data to/from IP telephones 110, and computer 160, for example.

Processor 220 may include any type of processor or microprocessor that interprets and executes instructions. Processor 220 may also include logic that is able to decode media files, such as audio files, video files, etc., and generate output to, for example, a speaker, a display, etc. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

IP address broker module 260 may include one or more mechanisms that may provide an IP address of an IP telephone(s) 110 when an IP telephone 110 registers and/or communicates over networks 120 and 170, for example. In other implementations, the function of IP address broker module 260 may be contained and performed in server 151.

Encryption module 270 may include one or more mechanisms that may encrypt digital data before transmission over a network. For example, encryption module 270 may include software programs that may modify data to be transmitted. Encryption module 270 may also transmit information relating to encryption keys necessary to decrypt data, for example. In other implementations of the invention, the function of encryption module 270 may be contained and performed in server 151.

IP telephone database interface 280 may include, for example, database interface mechanisms to provide web-based interfacing screens used to receive IP telephone data. The web-based interface screens may, for example, prompt a user to enter data relating to IP telephones. IP telephone database interface 280 may also contain access privilege processing that may determine accessibility to database 290. For example, in one implementation, only administrators may have access to the database 290 through interface 280. For example, a class of data structures within the database 290 and database interface 280, may provide facilities to establish and maintain a connection from an administrator, using computer 160 for example, to the database 290. This class of data structures may contain for example, a host, a name, a user, a password and a link.

An administrator or operator may access another class of data structures through interface 280 in order to retrieve from and save IP telephone data to IP telephone database 290. This class of data structures for example, may include a phone ID, a Media Access Control (MAC) address, a location code, an IP address, a template ID, a vendor, an attribute name, and attributes. This exemplary class of data structures may also be searchable through the IP telephone database interface 280 by an administrator, for example.

Another class of data structures that may be accessed through database interface 280 may include elements of a single phone template, and methods to retrieve from and save these elements to database 290. For example, this class may include a template ID, the template name, template description, attribute names and attributes. The methods that may be performed using this class of data structures may include, a get attribute, a set attribute, a save and a fetch function.

The interface 280 may also provide communication methods to transfer data stored in the IP telephone database 290 to an IP telephone 110, for example.

IP telephone database 290 may contain for example, a relational database of IP telephone data associated with each IP telephone 110. For example, a phone data table may contain attributes that identify each IP telephone 110. There may be one table stored per IP telephone 110 in IP telephone database 290. For example, each phone table may contain an ID number, a MAC address, a phone label, a line 1 name, a location code, an IP address, a template ID, a vendor and a file configuration name. A phone configuration file or table stored in IP telephone database 290 may contain specific attributes that may be downloaded to an IP telephone 110. In an exemplary implementation, there may be one phone configuration table per attribute per IP telephone 110. Fields in this exemplary phone configuration table may include a phone ID, a sequence number, an attribute name, an attribute value and a phone ID+sequence number, for example.

A templates table may also be stored in IP telephone database 290 and may contain information needed to identify and describe each template, for example. There may be one table per template stored in IP telephone database 290. A template table may contain for example, a template ID, a template name and a template description. A template details table may contain attributes associated with each template, for example. There may be one table per element per template stored in IP telephone database 290. Fields in this relational table may include, for example, a template ID, a sequence number, an attribute name, an attribute value and a template name+sequence number.

In other implementations, IP telephone database 290 may be contained remotely from server 150.

According to an exemplary implementation, server 150 may perform various processes in response to processor 220 executing sequences of instructions contained in memory 230. Such instructions may be read into memory 230 from another computer-readable medium, such as storage device 250, or from a separate device via communication interface 200. It should be understood that a computer-readable medium may include one or more memory devices or carrier waves. Execution of the sequences of instructions contained in memory 230 causes processor 220 to perform the acts that will be described hereafter. In alternative embodiments, hardwired circuitry may be used in place of or in combination with software instructions to implement aspects of the embodiments. Thus, the systems and methods described are not limited to any specific combination of hardware circuitry and software.

Figure 3:
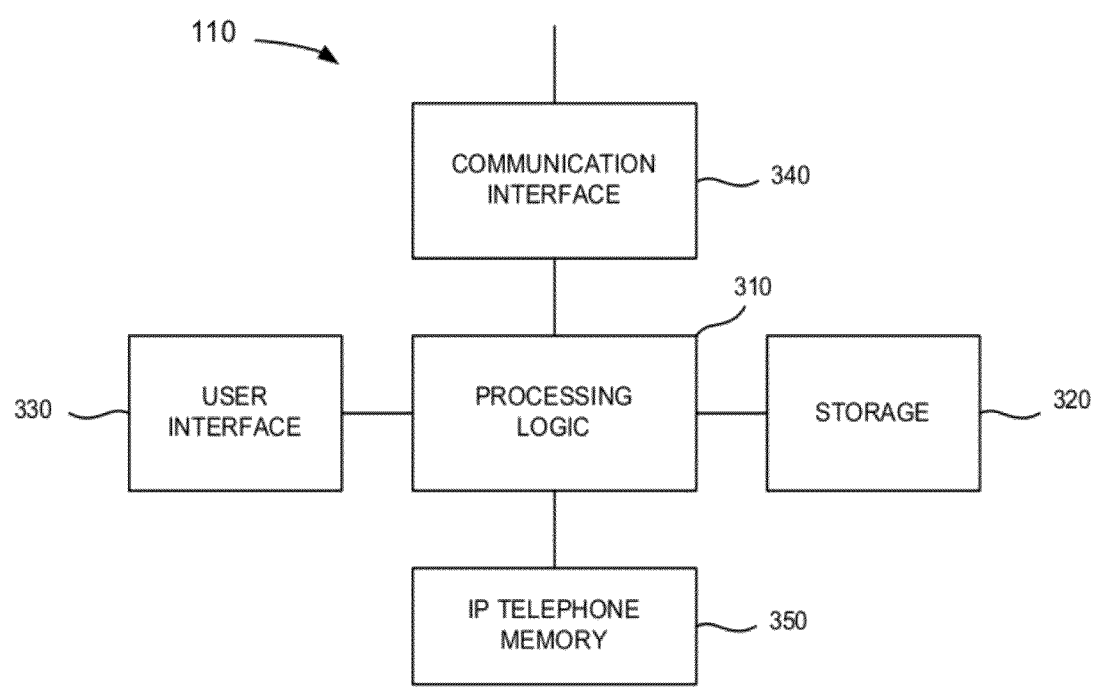
FIG. 3 is a diagram of an exemplary IP telephone shown in FIG. 1.

FIG. 3 is a diagram of exemplary components of an IP telephone 110. As shown in FIG. 3, IP telephone 110 may include processing logic 310, storage 320, user interface 330, communication interface 340, and IP telephone memory 350. Processing logic 310 may include a processor, microprocessor, an application specific integrated circuit (ASIC), field programmable gate array (FPGA), or the like. Processing logic 310 may include data structures or software programs to control operation of IP telephone 110 and its components. Storage 320 may include a random access memory (RAM), a read only memory (ROM), and/or another type of memory to store data and instructions that may be used by processing logic 310.

User interface 330 may include mechanisms for inputting information to IP telephone 110 and/or for outputting information from IP telephone 110. Examples of input and output mechanisms might include a speaker to receive electrical signals and output audio signals, a microphone to receive audio signals and output electrical signals, control buttons and/or keys on a keypad to permit data and control commands to be input into IP telephone 110, and a display to output visual information.

Communication interface 340 may include hardware and software for communicating over one or more networks including an Internet Protocol (IP) network, a telephone network, such as the (PSTN), a (MAN), a (LAN), and a (WAN). Communication interface 340 may also include a modem or an Ethernet interface, for example, that may communicate using Voice over Internet Protocols (VoIP) for example. Communication interface 340 may also be configured to communicate with computer 160, servers 150 and 151 and other telephone devices.

IP telephone memory 350 may contain IP telephone data necessary to allow telephone communications in IP protocols. IP telephone memory 350 also may perform certain operations relating to receiving downloaded IP telephone data from server 150, and storing the downloaded data in memory 350. In different implementations, the downloaded IP telephone may be used to activate the provisioned features and functions of IP telephone 110.

IP telephone 110 may perform operations in response to processing logic 310 executing software instructions of a downloading and storing IP telephone data application contained in a computer-readable medium, such as storage 320. A computer-readable medium may be defined as a physical or logical memory device and/or carrier wave.

The software instructions may be read into storage 320 from another computer-readable medium or from another device via communication interface 340. The software instructions contained in storage 320 may cause processing logic 310 to perform processes that will be described later. Alternatively, hardwired circuitry may be used in place of or in combination with software instructions to implement processes consistent with the embodiments. Thus, implementations consistent with the principles of the embodiments described herein are not limited to any specific combination of hardware circuitry and software.

Figure 4:
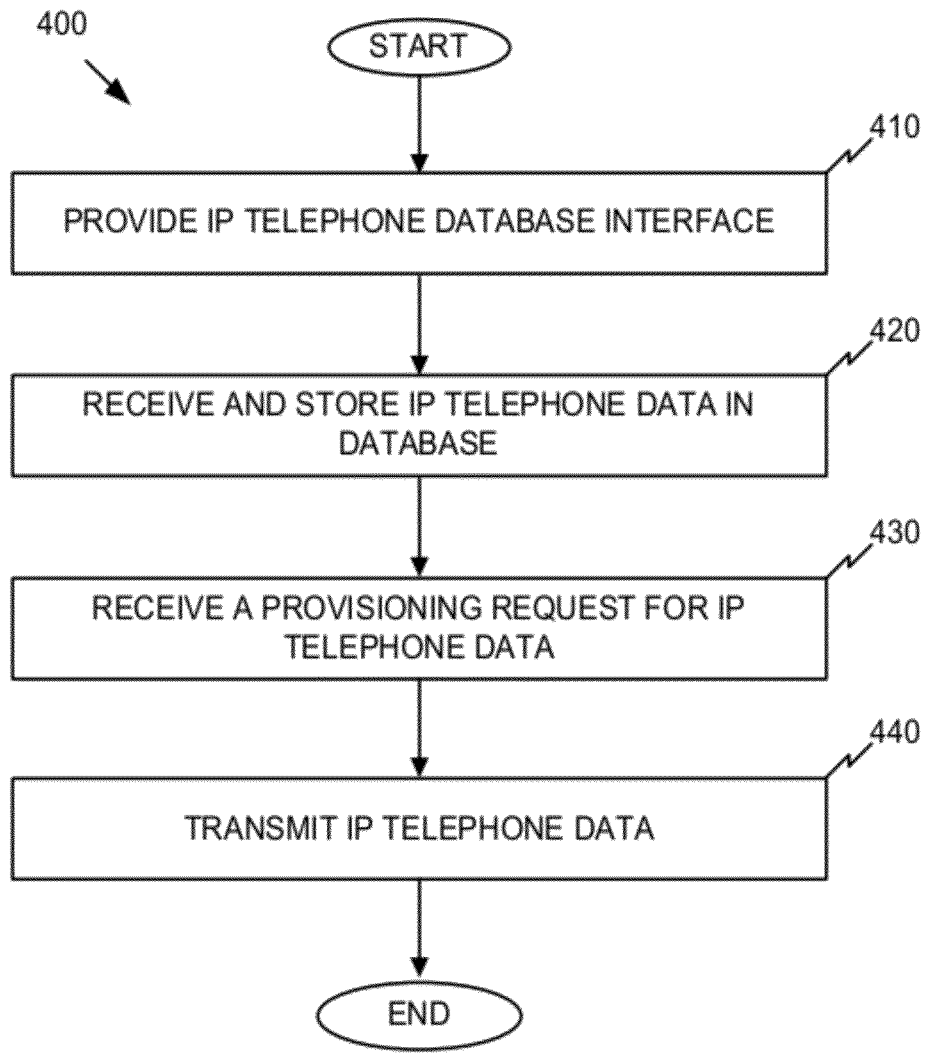
FIG. 4 is a flow diagram illustrating exemplary processing by a server shown in FIG. 2.

FIG. 4 illustrates exemplary processing 400 performed by server 150. Processing may begin when computer 160 connects to server 150 via network 170. For example, an administrator using computer 160 may access server 150 over an Internet connection. Once connected to server 150, IP telephone database interface 280 may provide an IP telephone database interface to computer 160 (act 410). FIG. 5 illustrates an exemplary interface 500 provided to computer 160. Referring to FIG. 5 for example, a main page of choices 510 may be presented to an administrator using computer 160 in order to interface with and access IP telephone database 290. Using the provided interface for example, an administrator may select an appropriate web-based interface screen and enter IP telephone data relating to a single IP telephone 110 or a number of IP telephones. An administrator may also use the provided interface screens from IP telephone database interface 280 to search or view data within the IP telephone database 290.

For example, an administrator may select an appropriate interface screen and begin to enter data for a single IP telephone 110. When the IP telephone data has been completely entered, an administrator may click on a "Save" button, for example. The IP telephone data entered via the interface screen may then be transmitted to server 150. Server 150 may then receive and store the IP telephone data in database 290 (act 420). In response to a "Saving" operation for example, the IP telephone data may be stored as a phone configuration table in database 290, as described in FIG. 2, for example. While storing data, processor 220 may also perform data checking operations to ensure the accuracy of the entered data. For example, IP address or location codes may be compared to other IP telephones at the same location to ensure that the entered IP telephone data is accurate.

In another implementation, predetermined IP data elements common to multiple IP telephones 110 may be provided in a template so that an administrator may efficiently enter IP telephone data. For example, all the IP telephones in a business may have the same IP telephone data except for a phone ID and an IP address. The administrator may use the IP telephone database interface 280 to access a stored template in database 290 that contains all the predetermined common IP telephone data elements for phones used by the particular business, for example. The administrator may then simply enter only the necessary user specific data needed to provision an IP telephone 110, for example.

After IP telephone data is stored in IP telephone database 290, the IP telephone data may be downloaded to provision an IP telephone 110. For example, server 150 may receive a request for data to provision an IP telephone (act 430). A provisioning request may be transmitted from computer 160. For example, an administrator may enter data identifying an IP telephone 110 or a number of IP telephones through a provided interface screen, and then click on a "Transmit" button that will prompt sever 150 to transmit the IP telephone data to the appropriate IP telephone 110. The received provisioning request in act 430 may include a request to provision a single IP telephone 110 or the request may include provisioning a plurality of IP telephones 110, for example.

The received provisioning request may also be sent automatically from another network device or server, for example. For example, a business connected to network 120 may wish to update IP telephone features at a time when no users may be accessing the IP telephone system. A network device or server in network 120 for example, may be programmed to automatically request provisioning data from server 150 at midnight on a Saturday night. This automatically programmed provisioning request sent from network 120, may then be received by server 150 (act 430). A request for provisioning data may also automatically be transmitted to server 150 when an IP telephone 110 is connected to a network, such as network 120, for example.

Once the provisioning request has been received by server 150, the appropriate IP telephone data may be transmitted to an IP telephone 110 (act 440). For example, IP address broker module 260 may provide the IP address of the receiving IP telephone 110. Then, for example, the IP telephone data may be transferred from the IP telephone database interface 280 to the appropriate IP telephone 110. In further implementations, only updated or changed data in IP telephone database 290 may be transmitted to IP telephone 110 in act 440. For example, if an administrator has changed the data associated with IP telephones 110, such as various features (e.g. call forwarding, message waiting indication, etc.), only the changes may be provided.

In additional implementations, groups of IP telephones 110 may receive transmitted IP telephone data in act 440. For example, IP telephone data may be transmitted to each IP telephone 110 in the group one phone at a time, or data common to all phones in the group may be transmitted simultaneously, and phone specific data may be transmitted to each IP telephone 110 separately. The transmitted IP telephone data in act 440 may also be encrypted before transmission to IP telephone 110 using encryption module 270, for example.

As discussed above, FIG. 5 illustrates an exemplary interface screen provided by server 150. In this example, interface screen 500 may be displayed on computer 160. For example, the Main Page of an interface may present to the operator a plurality of choices 510 relating to interactions with the IP telephone database 290.

In this exemplary interface screen provided by IP telephone interface 280, the choices 510 on interface screen 500 may be "View and Edit phone configuration files," "Search for a single phone configuration file," "Create a new phone configuration file," "Reload a single phone," "View and Edit a default phone configuration file," "View and Edit phone Templates," "Create a phone Template," "Add a new phone using a Template," "Create phone configurations via a MAC file" and "View and Edit a Dial Plan." By clicking on the appropriate link for example, an administrator may access the appropriate interface screens through the interface 280 in the desired manner. Each of exemplary choices 510 presented on screen 500 may present additional web-based interface screens.

Using the interface screens provided by IP telephone interface 280, a phone configuration file that may consist of the data structures for IP telephones 110 may be either created, searched for, viewed or edited by an administrator using computer 160, for example. Templates that may be stored in IP telephone database 290 may also be created and/or edited through provided interface screens, for example.

IP telephones 110 may also be provisioned by downloading the stored data from IP telephone database 290 using a "Reload a single phone" interface screen, for example. Using this exemplary interface screen, provisioning an IP telephone 110 may be performed by requesting the provisioning data from IP telephone database 290 in server 150 as described in act 430.

FIG. 6 shows an exemplary template interface screen 600 provided by server 150. Exemplary interface screen 600 may be presented to an administrator after clicking on the "Add a new phone using a Template" link provided by interface screen 500. In this example, the template name 610 is "Freeman & Associates," phone details column 620 presents the data stored in the template, and data entry boxes 630 may indicate to the administrator where telephone specific IP telephone data may be provided. In this example, IP telephone data may be provided for phone details "Phone ID," "MAC address," "User Info," "Password" for line 1 and "Password" for line 2. In this example, all other phone details shown in column 620 may already be provided and stored in the template in database 290. In this manner, IP telephone data may be quickly and accurately entered by an administrator. Once entered, IP telephone data may be stored in database 290 and downloaded to an IP telephone 110.

The data contained in exemplary template interface screen 600 may have been entered by an administrator after clicking on the "Create a phone Template," link shown in FIG. 5, for example. For example, after clicking on the "Create a phone Template," an administrator may be prompted to provide a title of the template. After titling the template, an administrator may be prompted to enter data relating to phone details 620. For example, phone details data 620 common to all IP telephones used by "Freeman & Associates" may be entered. For example, "Phone Label," "Dialplan," "Time Zone," "Network Media Type" and "Proxy Emergency Address," may be similar to all IP telephones 110 used by "Freeman & Associates." Phone details that are specific to each individual IP telephone 110 may be left as data entry boxes 630. In this manner, a template of predetermined IP telephone data that is common to a group of IP telephones 110 may be created by an administrator and saved into the IP telephone database 290.

In other implementations, an administrator may use the IP telephone database interface 280 to make global changes to IP telephone data stored in IP telephone database 290. For example, if "Freeman & Associates" updates their network with new software, an administrator may enter updated IP telephone data into a "Freeman & Associates" template stored in database 290. The updated data may then be stored in IP telephone database 290 and downloaded to all IP telephones 110 identified in the "Freeman & Associates" template, for example. In this exemplary implementation, a plurality of IP telephones 110 may be provisioned with a single data entry by an administrator.

FIG. 7 shows an exemplary phone edit interface screen 700 provided by server 150. Exemplary interface screen 700 may be presented to an administrator after clicking on the "View and Edit phone configuration files," link provided by interface screen 500. In this example, interface screen 700 contains an interface screen title 710, "Phone Edit Tool," a telephone details column 720, and telephone data column 730. In this example, telephone details column 720 may contain "IP Address," "Last Download," "Last Update," "MAC Address," "Phone Label," "Phone Type," "Template" and other details relating to "Line 1" and "Phone Attributes." In this example, telephone data column 730 contains the current IP telephone data stored in database 290 for an IP telephone 110. Using this exemplary phone edit interface screen 700, an administrator may efficiently view and edit IP telephone data for an IP telephone 110. If for example, an IP address of IP telephone 110 had been previously entered incorrectly, the incorrect IP address may be viewed, and then may be changed to a correct IP address by an administrator. Using this exemplary interface screen 700 provided by IP telephone database interface 280, IP telephone data may be quickly and accurately entered by an administrator. Once edited and entered, IP telephone data may be stored in IP telephone database 290 and downloaded to an IP telephone 110.

FIG. 8 shows an exemplary template edit interface screen 800 provided by server 150. Exemplary interface screen 800 may be presented to an administrator after clicking on the "View and Edit a phone Template" link provided by interface screen 500. In this example, exemplary interface screen 800 may contain an interface screen title 810, "Phone Template Edit," a template details column 820 and a template data column 830. Using this exemplary interface screen 800, an administrator may view and edit template data 830. For example, new "Proxy Server Address" information may be entered via interface screen 800 by an administrator. After entering new "Proxy Server Address" information for example, the new address information may be stored in the "Freeman & Associates" template in IP telephone database 290, and may then be downloaded to IP telephones 110, as described in FIG. 4.

FIG. 9 shows an exemplary dial plan interface screen 900 provided by server 150. Exemplary interface screen 900 may be presented to an administrator after clicking on the "View and Edit a Dial Plan" link provided by interface screen 500. In this example, the exemplary interface screen contains a title 910, "Dial Plan Edit," a "Match" column 920, a "Timeout" column 930, a "User" column 940, a "Route" column 950, a "Rewrite" column 960 and a "Comments" column 970. In this exemplary interface screen 900, data in the "Match" column 920 that relates to steering and screening digits, may be entered and/or edited by an administrator. For example, a dial plan may include three digit codes relating to the office locations of "Freeman & Associates." These exemplary three digit codes may be entered by an administrator and then may be saved into IP telephone database 290. After being stored in database 290, the dial plan information may be downloaded to IP telephones 110 as described in FIG. 4. Once the dial plan is downloaded to an IP telephone 110 in Denver for example, a user may call the Virginia location of "Freeman & Associates" by dialing the three digit code "703." Using this exemplary interface screen 900, IP telephone data relating to dial plans may be efficiently entered by an administrator, stored in IP telephone database 290, and downloaded to provision IP telephones 110.

CONCLUSION

Implementations consistent with the systems and methods described herein allow a server to store data received through an interface in an IP telephone database and to transmit data from the IP telephone database to an IP telephone. In addition, these embodiments enable IP telephone data to be downloaded to a user's IP telephone in a manner that requires little to no input by the user. This helps increase a user's satisfaction level with respect to IP telephone provisioning.

The foregoing description of the embodiments provides illustration and description, but is not intended to be restrictive or to limit implementations to the precise form disclosed. Modifications, additions and variations are possible in light of the above teachings without departing from the broader scope of the embodiments as set forth in the claims that follow.

For example, the embodiments have been described in the context of a server transmitting IP telephone data via a network. In addition, the embodiments have been described as being implemented by IP telephones connected to a communications network. The embodiments may be implemented in other devices or systems and/or networks.

Further, while series of acts have been described with respect to FIG. 4, the order of the acts may be varied in other implementations. Moreover, non-dependent acts may be performed in parallel.

It will also be apparent to one of ordinary skill in the art that aspects of the implementations, as described above, may be implemented in cellular communication devices/systems, methods, and/or computer program products. Accordingly, the implementations may be embodied in hardware and/or in software (including firmware, resident software, micro-code, etc.). Furthermore, the implementations may take the form of a computer program product on a computer-usable or computer-readable storage medium having computer-usable or computer-readable program code embodied in the medium for use by or in connection with an instruction execution system. The actual software code or specialized control hardware used to implement aspects of the embodiments is not limiting of the systems and methods described. Thus, the operation and behavior of the aspects were described without reference to the specific software code—it being understood that one of ordinary skill in the art would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

No element, act, or instruction used in the description of the present application should be construed as critical or essential to the systems and methods described unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the systems and methods described herein are defined by the claims and their equivalents.

What is claimed is:

1. A method comprising:
receiving, by a server device and from a computer device, data that includes configuration information for an internet protocol (IP) telephone,
verifying, by the server device, accuracy of the data by comparing at least a portion of the data to other data associated with one or more other IP telephones, the portion of the data including one or more of an IP address or a location code;
the computer device being different from the IP telephone;
verifying, by the server device, accuracy of the data by comparing at least a portion of the data to other data associated with one or more other IP telephones,
the portion of the data including one or more of an IP address or a location code;
receiving, by the server device, a request for the data,
the request relating to provisioning the IP telephone by using the data; and transmitting, by the server device and to the IP telephone, information associated with the data to provision the IP telephone based on the request and after verifying the accuracy of the data.

2. The method of claim 1, where the data is received via an interface and is transmitted via a network that connects the server device to the computer device.

3. The method of claim 2,
where the interface includes a plurality of web-based interface screens, and
where the request is received via at least one of the web-based interface screens.

4. The method of claim 1, where transmitting the information associated with the data further includes:
automatically obtaining an IP address of the IP telephone based on receiving the request; and
transmitting the information associated with the data to the IP address of the IP telephone.

5. The method of claim 1, further comprising:
receiving a different request to modify the data, and
modifying the data based on the different request.

6. The method of claim 5, further comprising:
transmitting, to the IP telephone, information regarding modifying the data.

7. The method of claim 5,
where the different request is a request to modify the data based on particular data associated with a particular feature of the IP telephone, and
where the information regarding modifying the data enables the IP telephone to implement the particular feature of the IP telephone based on the particular data.

8. The method of claim 1, further comprising:
identifying the one or more other IP telephones that are at a same location as the IP telephone, and
identifying the other data of the one or more other IP telephones before verifying the accuracy of the data.

9. The method of claim 1, further comprising:
provide, for display and to the computer device, an interface to access a template associated with the IP telephone, and
receive, via the template, a selection of one or more options related to a particular feature of the IP telephone.

10. A system comprising:
one or more processors to:
receive data that includes configuration information for a telephone;
identify one or more other telephones that at a same location as the telephone;
identify other data associated with the one or more other telephones;
identify one or more other telephones that are at a same location as the telephone;
identify other data associated with the one or more other telephones;
determine accuracy of the data by comparing at least a portion of the data to at least a portion of the other data associated with the one or more other telephones;
receive a request for the data to provision the telephone; and
transmit, after determining the accuracy of the data and based on the request, the data to the telephone.

11. The system of claim 10, where, when receiving the data, the one or more processors are to:
receive the data from a computer that is separate from the telephone.

12. The system of claim 10, where the one or more processors are further to:
provide, for display, an interface to access a template associated with the telephone, and
receive, via the template, a selection of one or more options related to a particular feature of the telephone.

13. The system of claim 12, where the one or more processors are further to:
modify particular data, of the data, that is associated with the particular feature of the telephone based on the selection of the one or more options.

14. The system of claim 10, where the configuration information includes at least one of:
a network address associated with the telephone,
a telephone number associated with the telephone,
a usage plan associated with the telephone, or
information associated with a user associated with the telephone.

15. The system of claim 10, where the one or more processors are further to:
modify particular data, of the data, that is associated with a particular feature of the telephone; and
transmit information regarding modifying the particular data to the telephone and to the one or more other telephones.

16. A non-transitory computer-readable medium storing instructions, the instructions comprising:
one or more instructions that, when executed by at least one processor, cause the at least one processor to:
identify other data associated with one or more other telephones;
compare at least a portion of the data to the other data, the portion of the data including at least one of a network address or a location code;
receive data that includes configuration information for a telephone;
identify other data associated with one or more other telephones;
compare at least a portion of the data to the other data, the portion of the data including at least one of a network address or a location code;
determine that the data is accurate based on comparing the at least the portion of the data to the other data associated with the one or more other telephones;
receive a request for the data to provision the telephone; and
transmit, after determining that the data is accurate and based on the request, the data to the telephone.

17. The non-transitory computer-readable medium of claim 16, where the instructions further comprise:
one or more instructions that, when executed by the at least one processor, cause the at least one processor to:
receive a different request relating to enabling a particular feature of the telephone,
modify the data based on the different request, and
transmit information regarding modifying the data to the telephone.

18. The non-transitory computer-readable medium of claim 16, where the instructions further comprise:
one or more instructions that, when executed by the at least one processor, cause the at least one processor to:
determine that a computer device is authorized to access the data, and
provide, to the computer device, information regarding the data after determining that the computer device is authorized to access the data.

19. The non-transitory computer-readable medium of claim 16, where the one or more other telephones are at a same location as the telephone.

20. The non-transitory computer-readable medium of claim 16,
   where the network address is of the telephone, and
   where the one or more instructions to transmit the data to the telephone comprise:
      one or more instructions that, when executed by the at least one processor, cause the at least one processor to:
         determine the network address of the telephone, and
         transmit the data to the network address of the telephone.

* * * * *